United States Patent
Donaldson

(10) Patent No.: US 11,022,987 B2
(45) Date of Patent: Jun. 1, 2021

(54) SYSTEMS AND METHODS FOR IMPROVED CONTROL OF IMPINGEMENT MIXING

(71) Applicant: Carlisle Fluid Technologies, Inc., Scottsdale, AZ (US)

(72) Inventor: Eric Julius Donaldson, Saint Paul, MN (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 16/040,537

(22) Filed: Jul. 19, 2018

(65) Prior Publication Data
US 2019/0022678 A1    Jan. 24, 2019

Related U.S. Application Data

(60) Provisional application No. 62/535,817, filed on Jul. 21, 2017.

(51) Int. Cl.
*G05D 16/00* (2006.01)
*B05B 12/00* (2018.01)
(Continued)

(52) U.S. Cl.
CPC .............. *G05D 16/028* (2019.01); *B05B 7/02* (2013.01); *B05B 12/006* (2013.01); *B05B 12/085* (2013.01); *B05B 12/10* (2013.01); *B05B 12/1436* (2013.01); *G05D 11/132* (2013.01); *G05D 16/00* (2013.01); *B01F 15/0416* (2013.01); *B05B 7/0018* (2013.01); *B05B 7/0408* (2013.01); *B05B 7/166* (2013.01); *B05B 7/1693* (2013.01)

(58) Field of Classification Search
CPC ...... B05B 12/1418; B05B 9/002; B67D 7/048
See application file for complete search history.

(56) References Cited

U.S. PATENT DOCUMENTS

| 4,703,894 A | 11/1987 | Fukuta et al. |
| 6,521,298 B1 * | 2/2003 | Banks ...................... B05D 1/02 |
| | | 427/385.5 |

(Continued)

FOREIGN PATENT DOCUMENTS

EP    1243341 A1    9/2002

OTHER PUBLICATIONS

"Momentum and Its Conservation—Lesson 2—The Law of Momentum Conservation" pp. 1-8 (Year: 2020).*
(Continued)

*Primary Examiner* — Santosh R Poudel
(74) *Attorney, Agent, or Firm* — Peter J. Beardsley

(57) ABSTRACT

A fluid delivery system includes a first pressure sensor disposed on or near a spray gun and configured to monitor a first fluid, and a second pressure sensor disposed on or near the spray gun and configured to monitor a second fluid. The fluid delivery system further includes control system comprising a processor configured to receive a first signal from the first pressure sensor and to receive a second signal from the second pressure sensor. The processor is further configured to derive a pressure difference between the first and the second pressure sensor representative of a fluid pressure difference between the first fluid and the second fluid and to control one or more pumps to obtain a desired pressure difference.

13 Claims, 2 Drawing Sheets

(51) Int. Cl.
  *B05B 12/08* (2006.01)
  *B05B 12/10* (2006.01)
  *G05D 11/13* (2006.01)
  *B05B 12/14* (2006.01)
  *B05B 7/02* (2006.01)
  *B05B 7/04* (2006.01)
  *B05B 7/16* (2006.01)
  *B01F 15/04* (2006.01)
  *B05B 7/00* (2006.01)

(56) References Cited

U.S. PATENT DOCUMENTS

| | | | | |
|---|---|---|---|---|
| 6,874,404 | B1* | 4/2005 | Elberson | B05B 7/2491 |
| | | | | 91/435 |
| 7,070,656 | B2* | 7/2006 | Hogan | A61J 3/005 |
| | | | | 118/630 |
| 8,561,921 | B1* | 10/2013 | Showman | B05B 7/0018 |
| | | | | 239/414 |
| 2006/0200263 | A1* | 9/2006 | Knight | G05B 23/0216 |
| | | | | 700/117 |
| 2007/0210182 | A1* | 9/2007 | Wulteputte | B05B 7/0416 |
| | | | | 239/71 |
| 2007/0235558 | A1* | 10/2007 | Ballu | B05B 5/1683 |
| | | | | 239/143 |
| 2009/0078791 | A1* | 3/2009 | Guillon | C23C 16/4486 |
| | | | | 239/398 |
| 2009/0280444 | A1* | 11/2009 | Watson | C03B 5/235 |
| | | | | 431/10 |
| 2010/0077959 | A1* | 4/2010 | Treloar | G09B 11/10 |
| | | | | 118/681 |
| 2011/0066086 | A1* | 3/2011 | Aarestad | A61F 5/56 |
| | | | | 601/11 |
| 2012/0187145 | A1 | 7/2012 | Gould et al. | |
| 2012/0291634 | A1* | 11/2012 | Startz | A47J 31/002 |
| | | | | 99/300 |
| 2013/0015262 | A1* | 1/2013 | Monchamp | B29B 7/7605 |
| | | | | 239/61 |
| 2014/0034751 | A1* | 2/2014 | Guillon | C23C 16/4486 |
| | | | | 239/74 |
| 2014/0131277 | A1 | 5/2014 | Gerhardt et al. | |
| 2015/0165403 | A1* | 6/2015 | Lutz | B01F 15/024 |
| | | | | 366/160.1 |
| 2016/0107179 | A1* | 4/2016 | McAndrew | B05B 12/1418 |
| | | | | 239/13 |
| 2018/0126398 | A1* | 5/2018 | McAndrew | B05B 9/002 |

OTHER PUBLICATIONS

International Search Report & Written Opinion for PCT Application No. PCT/US2018/043181 dated Oct. 2, 2018, 13 Pages.

* cited by examiner

SYSTEMS AND METHODS FOR IMPROVED CONTROL OF IMPINGEMENT MIXING

CROSS REFERENCE TO RELATED APPLICATIONS

This application claims priority from and the benefit of U.S. Provisional Application Ser. No. 62/535,817, entitled "SYSTEMS AND METHODS FOR IMPROVED CONTROL OF IMPINGEMENT MIXING," filed Jul. 21, 2017, which is hereby incorporated by reference in its entirety for all purposes.

In certain impingement mixing systems, such as Spray Polyurethane Foam (SPF) systems, where materials undergo impingement mixing in a chamber or nozzle before being ejected from a gun and onto a substrate to form a foam insulation layer or other coating, improved efficiency of the impingement mixing process is dependent on many factors. It would be useful to improve control of impingement mixing systems, for example, to improve efficiency.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
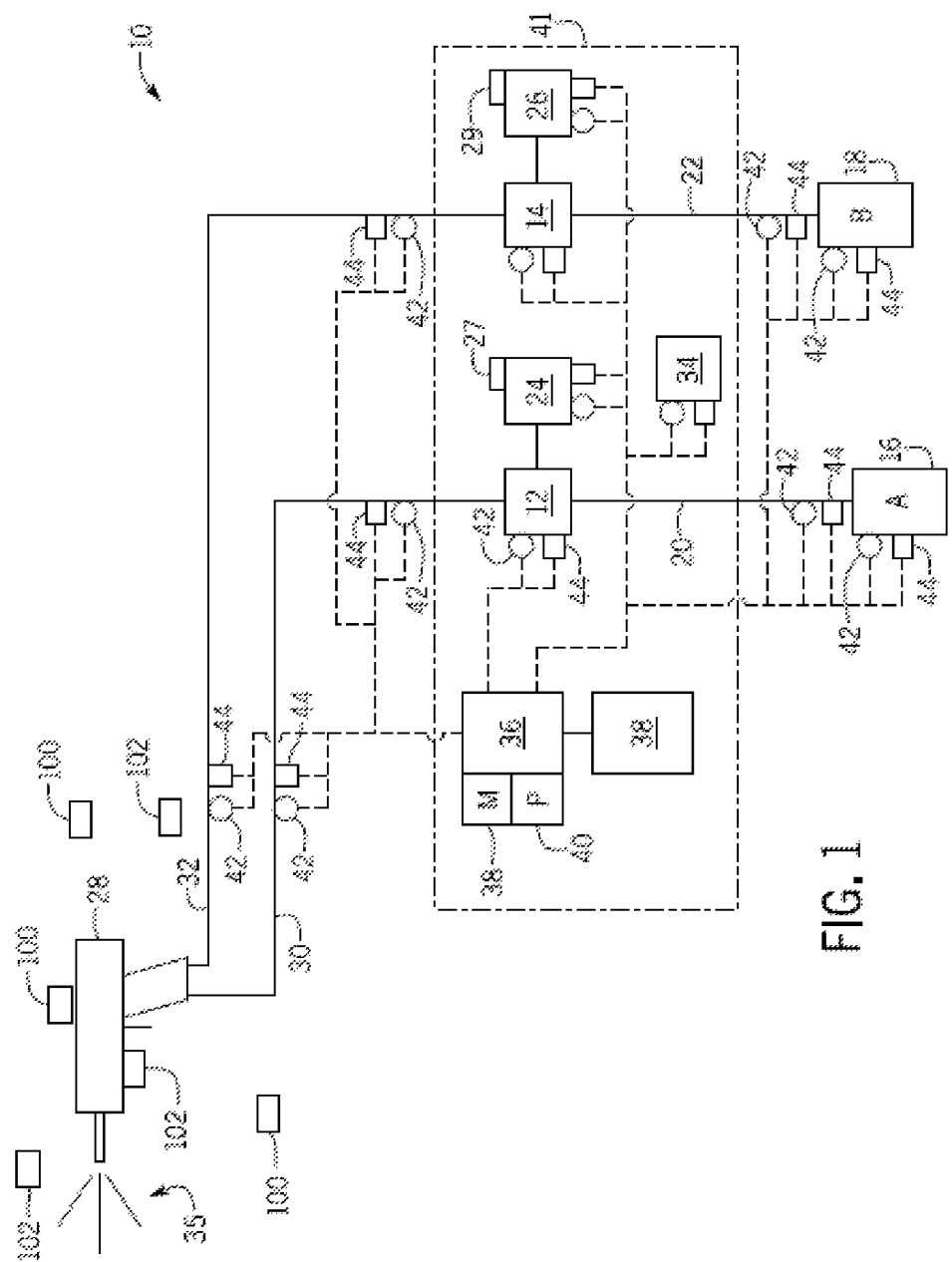
FIG. 1 is block diagram of an embodiment of an impingement system, such as a multi-component fluid delivery system (e.g., SPF system)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to systems and methods that may improve control for impingement systems, including two-part Spray Polyurethane Foam (SPF) systems. Many Spray Polyurethane Foam (SPF) and similar two-component (2K) dispensing systems deliver two fluid components at high pressure to a spray gun or other dispensing device, where the materials undergo impingement mixing in a chamber or nozzle before being ejected from the gun and onto a substrate to form a foam insulation layer or other coating. Impingement mixing relies on the inertia of two or more streams of reactive fluids to initiate a chemical reaction required for creating the foam or coating on the substrate. The efficiency of the impingement mixing process is dependent on many factors, including the pressure and temperature of the fluid streams, the size of the streams, the geometry of the mixing chamber and orifices, and the relative trajectories of the two impinging streams. If the pressure of the impinging component streams are significantly different, or are outside of certain processing limits, poor mixing of the reactive fluids may occur. This can lead to poor foam or coating quality, irregular or undesirable deposition patterns on the substrate, and/or build-up of material within the gun or dispensing device. In extreme pressure imbalance conditions, one of the component streams can "cross-over" into the orifice of the opposing stream and result in polymerization and hardening of material within the gun or device itself. This results in partial or complete occlusion of one stream, rendering the system unusable. Cross-over is a common failure mode in 2K systems, and a means to detect and prevent this occurrence would reduce or eliminate this problem and result in less down-time.

The temperatures of the impinging fluid streams may also be important parameters for controlling the chemical reaction rate and efficiency. If fluid temperatures are too low, the chemical reaction may be incomplete—or may be too slow for the foam or coating material to adhere properly to the target substrate. If they are too high, the reaction may be too fast, resulting in brittle foam or coatings, high amounts of overspray and atomization, or clogging of the gun/dispensing system.

Most material suppliers of 2K systems provide "target" pressures and temperatures of the fluid materials that should produce good output. In certain SPF systems, pressures and temperatures of both fluids at or near the spray gun are not known. Instead, pressure is measured at or near the fluid pumps, and used to control the pressure of the two materials at that location only. These pumps are at a significant distance from the spray gun, which is connected to the pumps via a hydraulic hose. Due to hose geometry, hose length, flow rates, and fluid properties, an unknown pressure drop will occur over the length of the hose. As a result, the actual pressure of the two fluids at or near the spray gun are unknown, uncontrolled, and possibly unequal. In addition, most SPF employ "yoked" piston pumps, driven by a single actuator. The actuator is either an electric motor or a hydraulic or pneumatic piston. Systems that use yoked pumps inherently lack the ability to provide independent pressure control of the two fluids.

In most SPF systems, the temperatures of both fluid streams are measured and controlled with independent heating systems as part of the proportioning (Proportioner) system. The Proportioner is typically contained in a truck or trailer at the job site, but outside of the structure that is being insulated. In most systems, one fluid stream contains an electronic temperature sensor within the hose and in contact with the fluid material. This temperature sensor is used to control heating elements within the hose structure for both materials, which is required to prevent or reduce cooling of the fluid between the Proportioner and the spray gun.

In certain embodiments, the techniques described herein control the pressures between two or more hoses to minimize their difference at/near a gun (e.g., spray gun). The control may derive or otherwise obtain a desired difference between pressure at/near the gun. The desired pressure difference may be zero, may be some other user input value, and/or may be a derived value. The derived value, for example, may be derived via a controller so that the derived value pressure difference may improve, for example, impingement mixing at the gun, and may be provided by modeling in a test bench the mixing at various pressure differences, via simulation (e.g., fluid modeling simulation), and so on.

It may be useful to describe a system that may apply improved control for impingement mixing as described herein. Accordingly and turning now to FIG. 1, the figure is a block diagram illustrating an embodiment of a spray application system 10 that may include one or more liquid pumps 12, 14. The spray application system 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds. The pumps 12 and 14 may be independently controlled.

During operations of the spray application system 10, the pumps 12, 14 may be mechanically powered by motors 24, 26, respectively. In a preferred embodiment, the motors may be electric motors. However, internal combustion engines (e.g., diesel engines), pneumatic motors, or a combination thereof. Motor controllers 27 and 29 may be used to provide for motor start/stop, loading, and control based on signals transmitted, for example, from the processor 40. The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types.

The pumps 12, 14 provide for hydrodynamic forces suitable for moving the compounds A, B into a spray gun system 28. More specifically, compound A may traverse the pump 12 through conduit 20 and then through a heated conduit 30 into the spray gun system 28 to be mixed via impingement with compound B. Likewise, compound B may traverse pump 14 through conduit 22 and then through a heated conduit 32 into the spray gun system 28 to be mixed via impingement with compound A. To heat the heated conduits 30, 32, a heating system 34 may be provided. The heating system 34 may provide for thermal energy, such as a heated fluid, suitable for pre-heating the compounds A and B before mixing and spraying and for heating the compounds A and B during mixing and spraying.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing ratio control actions to continue providing as desired ratio (e.g., 1:1) for compounds A and B in the presence of slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 38, which may include touchscreens, displays, keyboards, mice, augmented reality/virtual reality systems, as well as tablets, smartphones, notebooks, and so on. A user may input desired pressures, flow rates, temperatures, ratio between compound A and compound B (e.g., 1:1), alarm thresholds (e.g., threshold fluid levels of compound A, B in tanks 16, 18), and so on. The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 38 may then display several of the sensed conditions as well as the adjusted parameters. Certain components of the spray application system 10 may be included in or interface with a proportioning system 41. The proportioning system 41 may "proportion" or deliver the compounds A, B at a specified ratio (e.g., 1:1) to achieve the spray 35. In this manner, the user(s) may mix and spray chemicals, such as compounds A and B, to provide for certain coatings, such as insulative spray foam.

As mentioned earlier, the pumps 12, 14 may be independently controlled. The system 10 improves control by having:

Independent pressure and temperature sensing at or near the spray gun

Independent pressure and temperature control of the two fluids from the proportioner to the spray gun.

Independent control of fluid pressure and temperature based on pressure and temperature sensing at or near the spray gun.

To improve on the current systems, system 10 may use pressure and temperature sensing at or near the spray gun, and the use of these sensing signals to control independent pump actuators and heating systems. In turn, this level of independent control, based on pressure, flows, and/or temperature at or near the spray gun, results in improved control of impingement mixing within the spray gun.

In our approach, independent pressure sensors located at or near the spray gun (in the hoses 30, 32, in the outlet of the pumps 12, 14) may transmit pressure signals to the proportioner 41, where they are used in the pump actuator control system (e.g. control system 36) to achieve the desired output at the spray gun 28. The control system 36 can be configured to achieve independent pressure control in the two materials at or near the gun, or to minimize or to eliminate the pressure differences between the two materials at or near the gun. In addition, the pressure control algorithm can be configured to provide better equalization and control of impingement momentums of the two streams at or near the gun. Momentum equalization control can be important if/when there are known differences between the two fluids or orifice geometries that affect impingement stream momentums (e.g. fluid density of the two materials, orifice size of the two sides within the gun, etc.). An example of momentum equalization control would be to minimize the differences between "pseudo momentum" parameters $M_A$ and $M_B$ at a desired $P_A$ or $P_B$ (A or B fluid pressure)

$$M_A = P_A \times \rho_A \times D_A^2$$

$$M_B = P_B \times \Sigma_B \times D_B^2$$

$M_A$=Pseudo momentum of A stream within the mix chamber
$M_B$=Pseudo momentum of B stream within the mix chamber
$P_A$=Fluid pressure of A material in the hose at/near the spray gun
$P_B$=Fluid pressure of B material in the hose at/near the spray gun
$\rho_A$=Density of A fluid
$\rho_B$=Density of B fluid
$D_A$=Diameter of the A orifice in the gun
$D_B$=Diameter of the B orifice in the gun Independent pressure sensors 100 located in the vicinity of the spray gun that communicate signals from the vicinity of the spray gun to a Proportioning unit located outside of the spray area. The Proportioning unit controls a pump or pumps in a manner to minimize the pressure differences between the independent pressure sensors 100 located in the vicinity of the spray gun. These pressure sensors 100 can be within the gun, attached to portions of hoses, hose couplings or fittings for the two hoses, or within a fluid manifold structure near the gun that has independent inlet and outlet fluid passages for the two materials, and or pump 12, 14 outlets.

Independent pressure sensors 100 located in the vicinity of the spray gun that communicate signals from the vicinity of the spray gun to a proportioning unit located outside of the spray area. The proportioning system 41 controls a pump or pumps in a manner to minimize the momentum differences between the two impinging streams of fluid within the gun mix chamber by controlling pressures of the two streams to calculated levels that include other known fluid and geometric parameters that differ between the two fluid streams. The pressure sensors 100 can be within the gun, attached to hose couplings or fittings for the two hoses, or within a fluid manifold structure near the gun that has independent inlet and outlet fluid passages for the two materials.

Independent temperature sensors 102 located in the vicinity of the spray gun that communicate signals from the vicinity of the spray gun to a proportioning unit located outside of the spray area. The Proportioning system 41 controls the temperature of the fluids independently to achieve desired temperatures at the spray gun. These temperature sensors 102 can be within the gun, attached to hose couplings or fittings for the two hoses (as well as in or around hoses), or within a fluid manifold structure near the gun that has independent inlet and outlet fluid passages for the two materials. Sensors on or near the gun and on or near fluid conduits (e.g., sensors 100, 102), such as fluid conduits 30, 32, may communicate with the control system 36 via wired means. For example, the conduits 30 32 may transmit electrical signals and/or electrical power in addition to working as fluid conduits. For example, the conduits 30, 32 may be smart hoses that include conductive elements embedded in the hoses. It is to be understood that the sensors, e.g., sensors 100, 102 may also communicate via wireless means (e.g., WiFi, Bluetooth, mesh networks, and so on).

Figure 2:
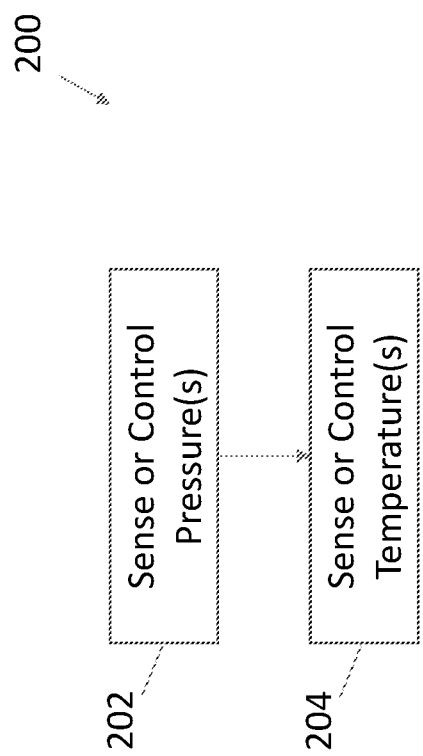
FIG. 2 is a flow chart of a process suitable for control of the fluid delivery system of FIG. 1.

Turning to FIG. 2, the figure illustrates a process 200 that may be used to implement certain of the techniques described herein. The process 200 may be implemented as computer code or instructions executable via, for example, the processor 40. It is to be noted that the blocks of the process 200 may be executed in any order or concurrently (e.g., in parallel with each other). In the depicted example, the process 200 may first sense or control pressures. For example, pressure sensors 100 located at or near the spray gun, in the hoses (or hose fittings) 30, 32, in the outlet of the pumps 12, 14, may transmit pressure signals to the processor 40. The processor 40 may then independently control pressure of the A and B compound (and/or any other two or more fluids) to minimize or to eliminate the pressure differences between the two (or more) materials at or near the gun 28, as described above, e.g., by adjusting pump rates, temperatures, flows, and so on, to arrive at equal pressures between A and B compounds.

The process 200 may also measure and/or control temperature (block 204). For example, temperature sensors 102 may be used to derive temperatures at or near the gun, at or near hoses, at or near pumps (e.g., pump outlets). The temperatures may then be used, for example via ideal gas law so that pressure×volume=n (moles)×R (gas constant)× Temperature (in Kelvins). Again, independent control of temperatures of the hoses, of the tanks (e.g., compound A and/or compound B tanks), and/or gun temperatures may be used to provide for equal pressure of fluids entering the gun. It is also to be noted that flow rates may be sensed, along with temperatures and/or pressures, to result in equal pressures of fluid being delivered to the gun 28.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A fluid delivery system, comprising:
  a first pressure sensor disposed on or near a spray gun and configured to monitor a first fluid;
  a second pressure sensor disposed on or near the spray gun and configured to monitor a second fluid;
  a first temperature sensor disposed on or near the spray gun and configured to monitor a first temperature of the first fluid;
  a second temperature sensor disposed on or near the spray gun and configured to monitor a second temperature of the second fluid; and
  a control system comprising a processor configured to:
    receive a user specified pressure difference between two fluids at the spray gun;
    receive a first signal from the first pressure sensor;
    receive a second signal from the second pressure sensor;
    heat the first fluid based on the first temperature to obtain the user specified-pressure difference;
    heat the second fluid based on the second temperature to obtain the user specified pressure difference;
    heat a mixture of the first and second fluids to obtain the user specified pressure difference;
    derive a pressure difference between the first and the second pressure sensor representative of a fluid pressure difference between the first fluid and the second fluid; and
    control one or more pumps based on the pressure difference to obtain the user specified pressure difference between the two fluids at the spray gun.

2. The system of claim 1, wherein the first pressure sensor is disposed on an inlet included in the spray gun.

3. The system of claim 1, wherein the first pressure sensor is disposed on a hose coupling or on a hose portion of a hose fluidly coupling the one or more pumps to the spray gun.

4. The system of claim 1, wherein the first pressure sensor is disposed on an outlet of the one or more pumps.

5. The system of claim 1, wherein the processor is configured to derive the fluid pressure difference by including the first temperature in the derivation.

6. The system of claim 1, wherein the processor is configured to apply an ideal gas law when including the first temperature in the derivation.

7. The system of claim 1, wherein the processor is configured to derive the fluid pressure difference by including the first and the second temperatures in the derivation.

8. A method, comprising:
  receiving a user specified pressure difference between two fluids at a spray gun;
  receiving a first signal from a first pressure sensor, wherein the first pressure sensor is disposed on or near the spray gun and configured to monitor a first fluid;
  receiving a second signal from a second pressure sensor, wherein the second pressure sensor is disposed on or near the spray gun and configured to monitor a second fluid;
  sensing a first temperature of the first fluid and controlling the first fluid temperature to obtain the user specified pressure difference, and wherein the user specified pressure difference is zero or a user inputted value inputted via a user interface;
  sensing a second temperature of the second fluid and controlling the first and the second fluid temperature to obtain the user specified pressure difference;
  providing a controller, wherein the controller is configured to heat the first fluid based on the first temperature to obtain the user specified pressure difference, heat the second fluid based on the second temperature to obtain the user specified pressure difference, and heat a mixture of the first and second fluids to obtain the user specified pressure difference;
  deriving, via the controller, a pressure difference between the first and the second pressure sensor representative of a fluid pressure difference between the first fluid and the second fluid; and
  controlling one or more pumps to obtain the user specified pressure difference between the two fluids at the spray gun.

9. The method of claim 8, wherein controlling the one or more pumps to obtain the user specified pressure difference comprises applying momentum equalization control.

10. The method of claim 9, wherein applying momentum equalization control comprises minimizing differences between "pseudo momentum" parameters $M_A$ and $M_B$ at a desired $P_A$ or $P_B$ wherein an A subscript in $M_A$ and $P_A$ denotes an A-side fluid system having the first pressure sensor wherein a B subscript in $M_B$ and $P_B$ denotes a B-side fluid system having the second pressure sensor.

11. A tangible, non-transitory, computer-readable medium comprising instructions that when executed by a processor cause the processor to:
  receive a user specified pressure difference between two fluids at a spray gun;
  receive a first signal from a first pressure sensor, wherein the first pressure sensor is disposed on or near the spray gun and configured to monitor a first fluid;
  receive a second signal from a second pressure sensor, wherein the second pressure sensor is disposed on an inlet included in the spray gun and configured to monitor a second fluid;
  sense a first temperature of the first fluid and control the first fluid temperature to obtain the user specified pressure difference, wherein the user specified pressure difference is zero or a user inputted value inputted via a user interface;
  sense a second temperature of the second fluid and control the second fluid temperature to obtain the user specified pressure difference;
  derive a pressure difference between the first and the second pressure sensor representative of a fluid pressure difference between the first fluid and the second fluid; and
  control one or more pumps to obtain the user specified pressure difference between the two fluids at the spray gun, wherein the processor is configured to heat the first fluid based on the first temperature to obtain the user specified pressure difference, heat the second fluid based on the second temperature to obtain the user specified pressure difference, and heat a mixture of the first and second fluids to obtain the user specified pressure difference.

12. The media of claim 11, wherein the instructions that cause the processor to control the one or more pumps comprise instructions that cause the processor to obtain the user specified pressure difference by applying momentum equalization control.

13. The media of claim 12, wherein applying momentum equalization control comprises minimizing differences between "pseudo momentum" parameters $M_A$ and $M_B$ at a desired $P_A$ or $P_B$ wherein an A subscript in $M_A$ and $P_A$ denotes an A-side fluid system having the first pressure sensor wherein a B subscript in $M_B$ and $P_B$ denotes a B-side fluid system having the second pressure sensor.

\* \* \* \* \*